(12) United States Patent
Song et al.

(10) Patent No.: US 11,046,196 B2
(45) Date of Patent: Jun. 29, 2021

(54) CHARGE PORT COVERING ASSEMBLY AND METHOD

(71) Applicant: Ford Global Technologies, LLC, Dearborn, MI (US)

(72) Inventors: Xiankai Song, Canton, MI (US); Michael T. Zitkovic, Dearborn, MI (US); Rodolfo Palma, Canton, MI (US); Mohammad Usman, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 16/046,036

(22) Filed: Jul. 26, 2018

(65) Prior Publication Data

US 2020/0031235 A1 Jan. 30, 2020

(51) Int. Cl.
*H01R 13/44* (2006.01)
*B60L 53/16* (2019.01)
*H02J 7/00* (2006.01)
*H01R 13/52* (2006.01)
*H01R 13/447* (2006.01)

(52) U.S. Cl.
CPC ............ *B60L 53/16* (2019.02); *H01R 13/447* (2013.01); *H01R 13/5213* (2013.01); *H02J 7/0042* (2013.01); *H01R 2201/26* (2013.01)

(58) Field of Classification Search
CPC .... B60L 53/16; H02J 7/0042; H01R 2201/26; H01R 13/447; H01R 13/5213
USPC .................................................. 439/137, 138
See application file for complete search history.

(56) References Cited

U.S. PATENT DOCUMENTS

| 4,176,897 | A | * | 12/1979 | Cameron | ............... | H01R 13/44 |
| | | | | | | 439/137 |
| 5,234,350 | A | * | 8/1993 | Marechai | ........... | H01R 13/4532 |
| | | | | | | 439/139 |
| 5,716,224 | A | * | 2/1998 | Masuda | ............. | H01R 13/4536 |
| | | | | | | 439/138 |
| 6,857,884 | B2 | * | 2/2005 | Kim | .................... | H04M 1/0202 |
| | | | | | | 439/137 |

(Continued)

FOREIGN PATENT DOCUMENTS

| CN | 207149762 | 3/2018 |
| CN | 107910686 | 4/2018 |

(Continued)

*Primary Examiner* — Hae Moon Hyeon
(74) *Attorney, Agent, or Firm* — David Kelley, Esq.; Carlson, Gaskey & Olds, P.C.

(57) ABSTRACT

A charge port covering assembly includes, among other things, doors moveable between a covering position where the doors block access to a charge port, and an accessing position where the doors permit access to the charge port. A door release assembly includes a portion that tilts in response to movement of a charger toward an engaged position with the charge port to permit movement of the doors to the accessing position. A charge port covering method includes, among other things, blocking access to a charge port using a doors in a covering position, and tilting a portion of a door release assembly with a charger. The tilting permits a transitioning of the doors from the covering position to an accessing position where the charger can couple with the charge port.

13 Claims, 10 Drawing Sheets

(56) References Cited

U.S. PATENT DOCUMENTS

| | | | | |
|---|---|---|---|---|
| 6,896,530 B2* | 5/2005 | Nishio | ............... | H01R 13/4534 |
| | | | | 439/137 |
| 8,465,305 B2* | 6/2013 | Wilkie | ................... | H02B 11/24 |
| | | | | 439/137 |
| 8,672,695 B2* | 3/2014 | Baldwin | ................ | H01R 24/78 |
| | | | | 439/137 |
| 8,905,769 B2* | 12/2014 | Neukam | ............ | H01R 13/4536 |
| | | | | 439/137 |
| 9,975,440 B1* | 5/2018 | Song | ....................... | B60L 53/16 |
| 10,355,390 B2* | 7/2019 | Ferran Palau | ........ | H01R 13/453 |
| 2003/0077929 A1* | 4/2003 | Funatsu | ............. | H01R 13/4532 |
| | | | | 439/137 |
| 2003/0148645 A1* | 8/2003 | Hashimoto | ......... | H01R 13/4532 |
| | | | | 439/137 |
| 2004/0092145 A1* | 5/2004 | Sasame | .............. | H01R 13/4536 |
| | | | | 439/137 |
| 2012/0208384 A1* | 8/2012 | Lazzaro | ............. | H01R 13/4536 |
| | | | | 439/149 |
| 2014/0206211 A1* | 7/2014 | Goughian | ............. | H01R 24/76 |
| | | | | 439/142 |
| 2015/0162691 A1* | 6/2015 | Choiselat | ........... | H01R 13/4532 |
| | | | | 439/139 |
| 2018/0309222 A1* | 10/2018 | Ferran Palau | ..... | H01R 13/4536 |

FOREIGN PATENT DOCUMENTS

| | | | | |
|---|---|---|---|---|
| EP | 2037542 | | 3/2009 | |
| JP | 2013208966 | | 10/2013 | |
| JP | 5531895 | | 6/2014 | |
| WO | WO-2014001206 A1 * | | 1/2014 | ......... H01R 13/4536 |

* cited by examiner

CHARGE PORT COVERING ASSEMBLY AND METHOD

TECHNICAL FIELD

This disclosure relates to covering a charge port of an electrified vehicle. Covering the charge port can prevent inadvertent contact with electrical connectors and can block dust, contaminates, and unwanted objects from entering the charge port. Covering the charge port can also inhibit tampering.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source, such as a grid source. During a charge using the grid source, a charger electrically connects the vehicle to the external power source. The charger couples to a charge port of the vehicle during the charging.

Some electrified vehicle cover the charge port with a cover that an operator must remove prior to coupling the charger to the charge port.

SUMMARY

A charge port covering assembly according to an exemplary aspect of the present disclosure includes, among other things, doors moveable between a covering position where the doors block access to a charge port, and an accessing position where the doors permit access to the charge port. A door release assembly includes a portion that tilts in response to movement of a charger toward an engaged position with the charge port to permit movement of the doors to the accessing position.

Another non-limiting embodiment of the foregoing assembly includes no more than two doors.

In another non-limiting embodiment of any of the foregoing assemblies, the doors move laterally away from one another when moving from the covering position to the accessing position.

In another non-limiting embodiment of any of the foregoing assemblies, the door release assembly includes a first door release associated with a first door, and a second door release associated with a second door. The first and second door releases are on opposing lateral sides of the charge port.

Another non-limiting embodiment of any of the foregoing assemblies includes a linkage assembly that operably connects together movement of the first door and movement of the second door.

Another non-limiting embodiment of any of the foregoing assemblies includes a first link bar pivotably coupled to the linkage assembly and the first door release, and a second link bar pivotably coupled to the linkage assembly and the second door release.

Another non-limiting embodiment of any of the foregoing assemblies includes a first door release cover about the first door release, and a second door release cover about the second door release. The first and second door release covers are pivotably coupled to the charge port and configured to pivot in response to movement of the charger toward the engaged position.

In another non-limiting embodiment of any of the foregoing assemblies, the first door release cover and the first door are configured to retract around a first lateral side of the charge port in response to movement of the charge toward the charge port. The second door release cover and the second door are configured to retract around an opposite, second lateral side of the charge port in response to movement of the charger toward the charge port.

In another non-limiting embodiment of any of the foregoing assemblies, the first door release includes a first lock tang and the second door release includes a second lock tang. Tilting the portion of the door release assembly moves the first and second lock tangs from a blocking position to a releasing position. The first and second lock tangs in the blocking position block movement of the first and second doors to the accessing position. The first and second lock tangs in the releasing position permit movement of the first and second doors to the accessing position.

In another non-limiting embodiment of any of the foregoing assemblies, the first door includes an outwardly facing side that faces away from the charge port when in the engaged position, and an inwardly facing side that faces the charge port when in the engaged position. The first lock tang engaging an inwardly facing surface of a ledge provided in the first door when the first door is in the engaged position.

In another non-limiting embodiment of any of the foregoing assemblies, the first and second lock tangs are closer to each other when in the blocking position than when in the releasing position.

In another non-limiting embodiment of any of the foregoing assemblies, the charge port is a noncircular charge port.

In another non-limiting embodiment of any of the foregoing assemblies, the charge port is a Direct Current charge port.

A charge port covering method according to another exemplary aspect of the present disclosure includes, among other things, blocking access to a charge port using a doors in a covering position, and tilting a portion of a door release assembly with a charger to permit a transitioning of the doors from the covering position to an accessing position where the charger can couple with the charge port.

Another exemplary non-limiting embodiment of the foregoing method includes moving the doors laterally away from each other when transitioning the doors from the covering position to the accessing position.

Another exemplary non-limiting embodiment of any of the foregoing methods includes retracting the doors along opposing lateral sides of the charge port when in the accessing position.

In another exemplary non-limiting embodiment of any of the foregoing methods, the tilting includes rotating a first pivot member of the door release assembly against a second pivot member to move a lock tang of the second pivot member from a blocking position that blocks movement of one of the doors to the accessing position to a releasing position that permits movement of the one of the doors to the accessing position.

In another exemplary non-limiting embodiment of any of the foregoing methods, the first pivot member and the second pivot member are pivotably coupled to an inner housing and held within a door release housing.

In another exemplary non-limiting embodiment of any of the foregoing methods, the door release assembly includes a first door release associated with a first door, and a second door release associated with a second door. The first and second door releases are on opposing lateral sides of the charge port.

In another exemplary non-limiting embodiment of any of the foregoing methods, the first and second door release assemblies are coupled together through a linkage assembly such that the first and second door release assemblies retract together along opposite lateral sides of the charge port when the doors transition from the covering position to the accessing position.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to covering a charge port of an electrified vehicle with a doors of a charge port covering assembly. Covering the charge port when a charger is not coupled to the charge port can prevent inadvertent contact or tampering with electrical contactors. Tampering could include items like fingers, screwdrivers, other connectors, wires, metal rods, etc. moving toward electrical contactors with the charge part. The covering can additionally prevent contaminants, such as dust, from entering the charge port.

Notably, an operator does not need to remove the charge port covering assembly prior to coupling a charger to the charge port. Instead, the charge port covering assembly moves to a position where the doors are retracted in response to movement of the charger.

Figure 1:
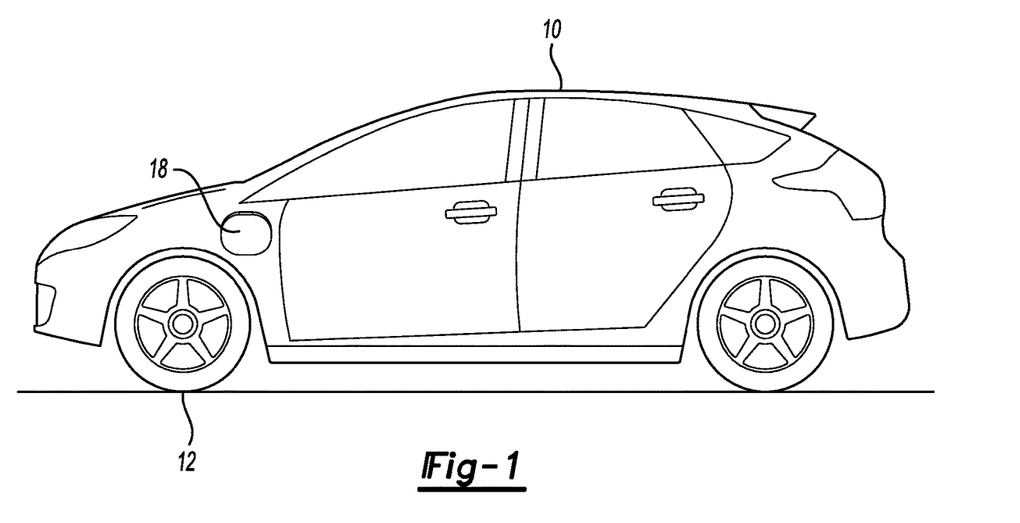
FIG. 1 illustrates a side view of an example electrified vehicle having a charge port.
Figure 2:
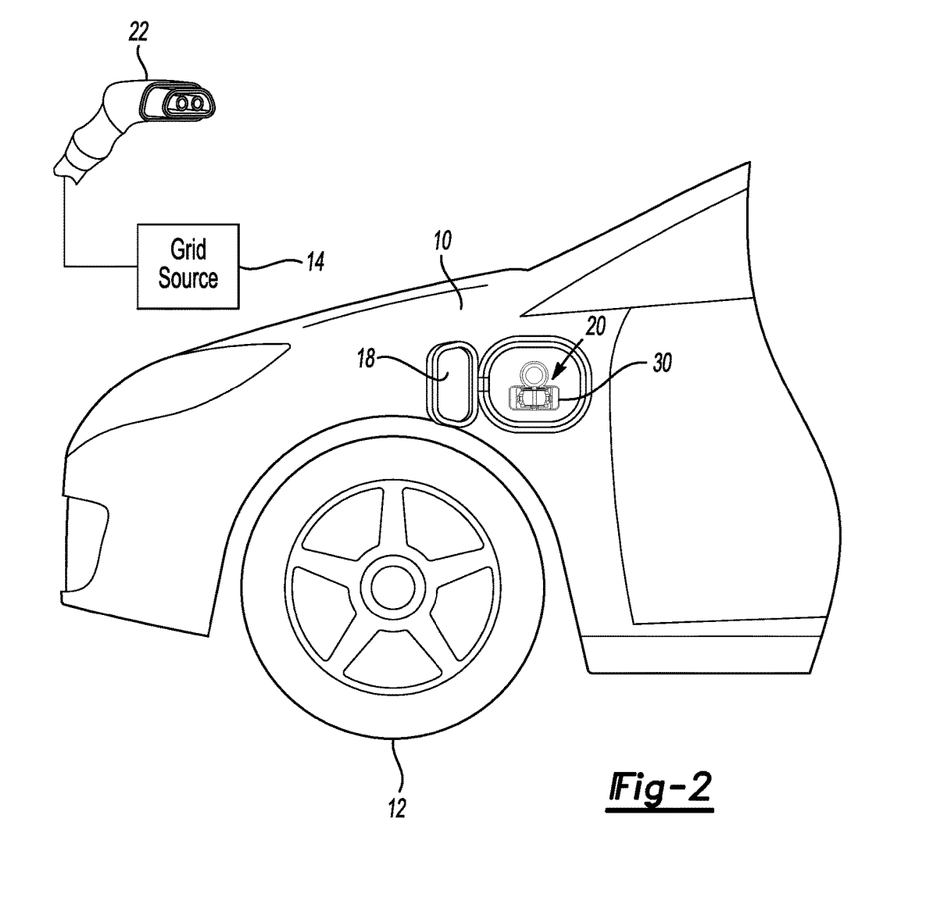
FIG. 2 illustrates a close-up view of the charge port of the electrified vehicle of FIG. 1 and a charger.

Referring to FIGS. 1 and 2, an exemplary vehicle 10 is a plug-in hybrid electric vehicle (PHEV) that includes a traction battery. In another example, the vehicle 10 is a battery electric vehicle (BEV). Still other vehicles that incorporate charge ports are included within the scope of this disclosure.

A power-split powertrain of the vehicle 10 employs a first drive system and a second drive system. The first and second drive systems generate torque to drive one or more sets of vehicle drive wheels 12. The first drive system can include a combination of an internal combustion engine and a generator. The second drive system can include at least a motor, the generator, and the traction battery.

From time to time, charging the traction battery is required or desirable. When the vehicle 10 is moving, power from regenerative braking can charge the traction battery. When the vehicle 10 is stationary, an external power source, such as a grid source 14, can be used to charge the traction battery.

The vehicle 10 includes a charge port door 18 that, when closed, covers a charge port 20 of the vehicle 10. The charge port 20 provides an interface on the vehicle 10 for coupling a charger 22 to the vehicle 10. The charger 22 is connected to the grid source 14. When the charger 22 is coupled to the charge port 20, electrical power can move from the grid source 14, through the charger 22, to the traction battery of the vehicle 10. The grid source 14 can be at a vehicle operator's home, or at a public charging pole, for example.

The example charge port 20 is a non-circular, DC charge port of a combined AC/DC charge port assembly. In other examples, the charge port 20 is an AC charge port.

The charge port 20, as can be appreciated, includes electrical connectors. The charge port door 18 can cover the charge port 20 to provide some protection to the charge port 20 and for aesthetics.

Figure 3:
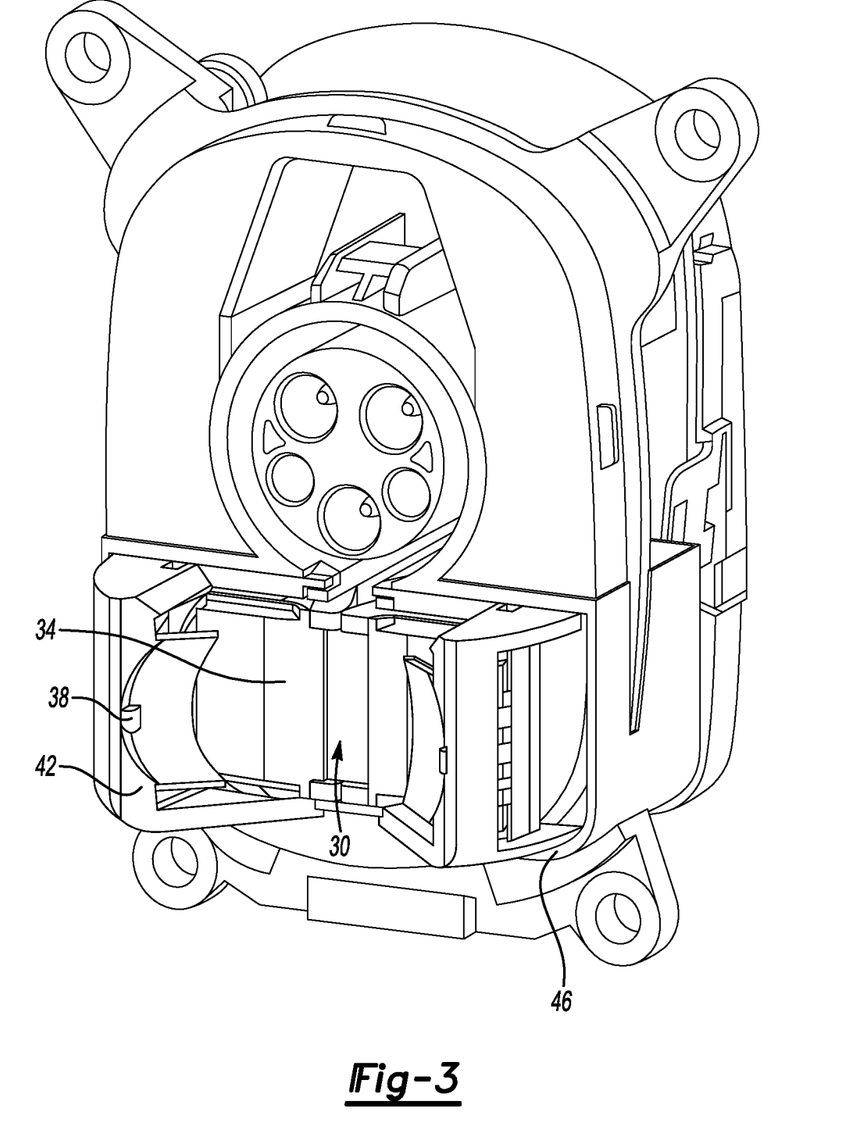
FIG. 3 illustrates a perspective view of an exemplary charge port covering assembly used in connection with the charge port of FIG. 2 and in a covering position.
Figure 4:
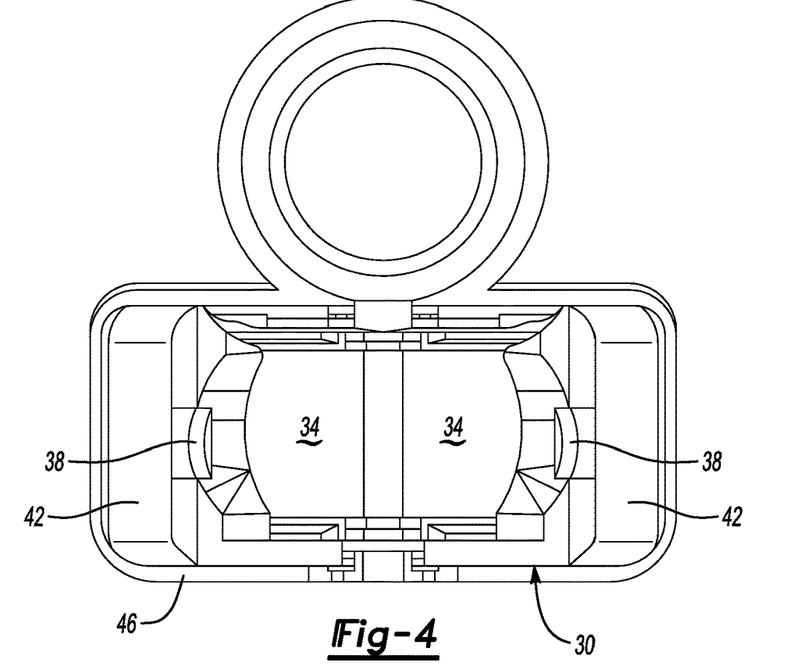
FIG. 4 illustrates a front view of the charge port covering assembly of FIG. 3.
Figure 5:
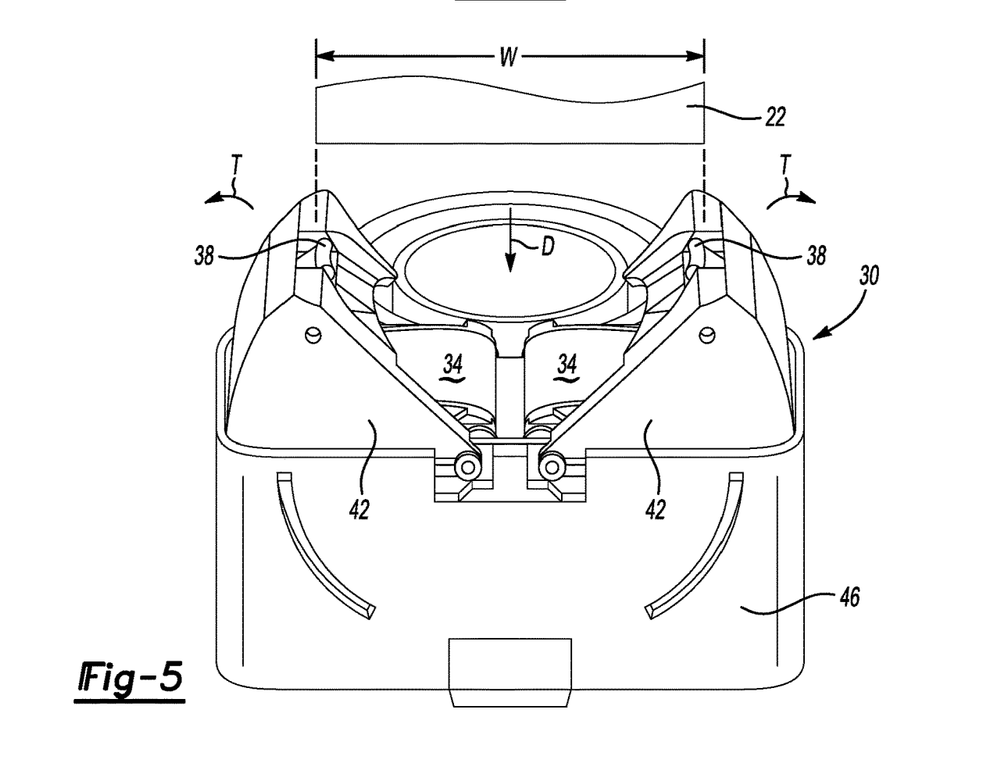
FIG. 5 illustrates another perspective view of the charge port covering assembly of FIG. 3.
Figure 6:
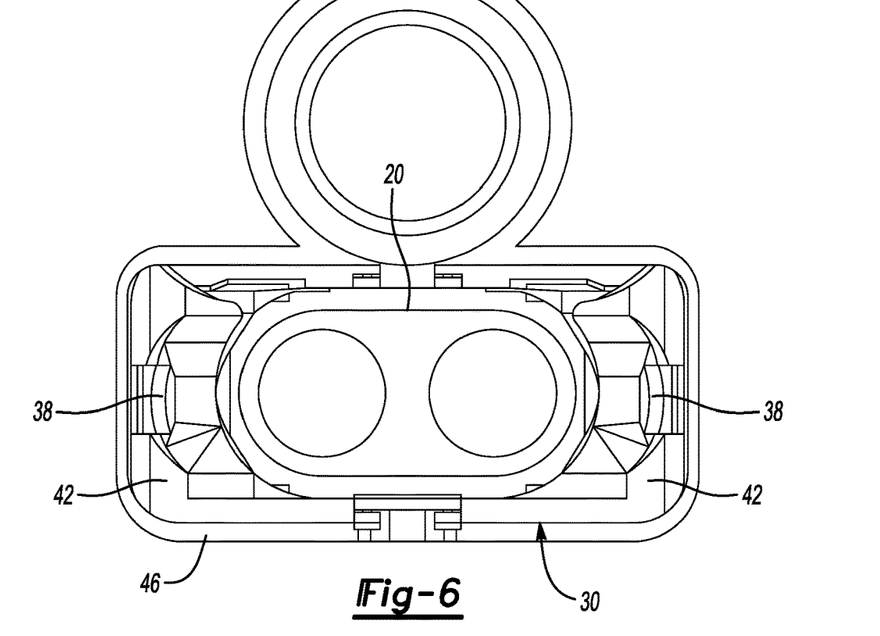
FIG. 6 illustrates a front view of the charge port covering assembly of FIG. 3 having doors in an accessing position.
Figure 7:
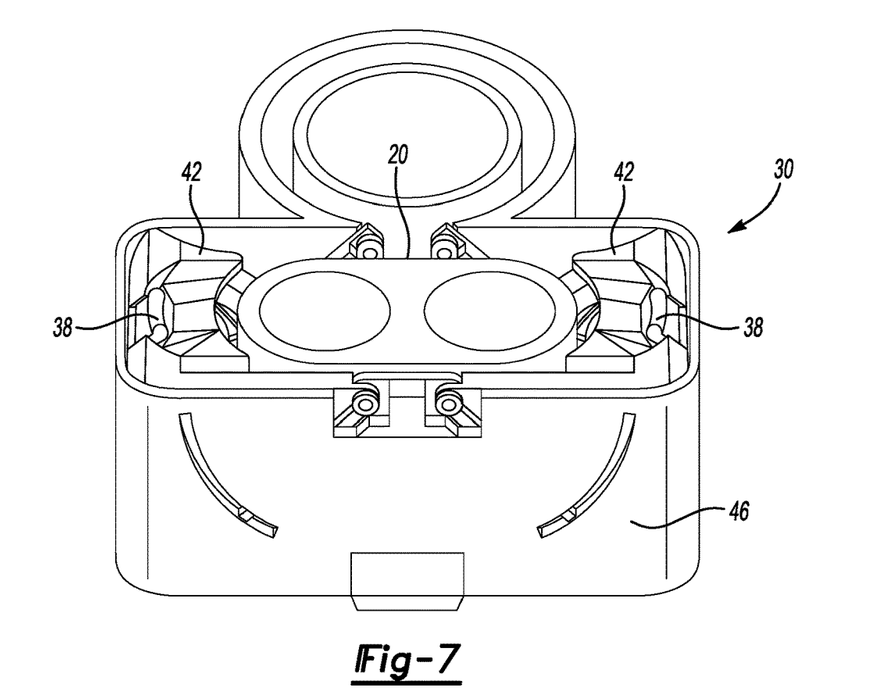
FIG. 7 illustrates another perspective view of the charge port covering assembly of FIG. 6.

With reference now to FIGS. 3-7 and continued reference to FIG. 2, the example vehicle 10 includes a charge port covering assembly 30 to protect the charge port 20. The charge port covering assembly 30 includes a plurality of doors 34 that can move back and forth from a covering position where the doors 34 cover the charge port 20 to an accessing position where the doors 34 are retracted laterally away from each other such that the charger 22 can electrically couple to the charge port 20. The covering position is shown in FIGS. 3-5. The accessing position is shown in FIGS. 6 and 7.

Notably, the movement of the charger 22 to an electrically coupled position with the charge port 20 transitions the doors 34 from the covering position to the accessing position. That is, a user is not required to uncouple a charge port cover from the charge port 20 prior to moving the charger 22 to the electrically coupled position.

The example charge port 20 is near the vehicle drive wheels 12 in a forward area of the vehicle 10. In other examples, the charge port 20 could be located in other areas of the vehicle 10, such as another location that is easily accessible by the user. The protection provided by the charge port covering assembly 30 may provide more design flexibility when locating the charge port 20.

The charge port covering assembly 30 is shown in connection with the charge port 20, which again is a DC charge port. In another example, the charge port covering assembly 30 could be used in connection with the AC charge port, or in connection with a combined AC/DC charge port.

In this exemplary non-limiting embodiment, the charge port covering assembly 30 includes, the doors 34, door release assemblies 38, door release covers 42, and an outer housing 46. One of the doors 34, door release assemblies 38, and door release covers 42 is disposed on each lateral side of the charge port 20. Moving the charger 22 (FIG. 5) in a direction D toward an electrically coupled position with the charge port 20 fits the charger 22 between the door release assemblies 38, which tilts a portion of the door release assemblies 38 outward in a direction T relative to the charge port 20. Tilting, for purposes of this disclosure, means moving or shifting the portions of the door release assemblies 38 from a home position to a leaned or inclined position relative to the home position. The tilting can be relative to the charger 22.

The tilting releases the doors 34 and permits the doors 34 to retract about the laterally outer sides of the charge port 20. When the doors 34 are retracted about the laterally outer sides of the charge port 20, the doors 34 are in the accessing position where the charger 22 can move further in the direction D to electrically couple to the charge port 20.

The charger 22 has a width W. The charge port covering assembly 30 is configured such that the charger 22 having the width W can tilt portions of the door release assemblies 38 to permit retraction of the doors 34. Chargers, and other items, having a width greater than the width W will not fit between the door release assemblies 38. The door release assemblies 38 will then not tilt to permit retraction of the doors 34. Chargers, and other items, having a width less than the width W will not be able to tilt portions of both the door release assemblies 38 when moved in the direction D thereby blocking these smaller items from retracting the doors 34. Configuring the charge port covering assembly 30 to having door release assemblies 38 that tilt in response to the charger 22, but not larger or smaller items, can help to ensure that the charge port 20 remains covered by the doors 34 when items other than the charger 22 are moved toward the charge port 20.

With reference now to FIGS. 8-11, the door release assemblies 38 each include, in this exemplary non-limiting embodiment, a first pivot member 50 with a release tab 54, a second pivot member 58 with a lock tang 62, and an inner housing 66. The first pivot member 50 is pivotably coupled to the inner housing 66 at a first pivot 70. The second pivot member 58 is pivotably coupled to the inner housing 66 at a second pivot 74. The inner housing 66 is pivotably coupled to the door release covers 42 (FIGS. 3-7) at a third pivot 78. The inner housings 66 are each pivotably coupled to one of the doors 34 at a fourth pivot 82. A linkage assembly 86 couples together movement of the door release assemblies 38.

When the doors 34 are in the covering position, a distance X between the release tabs 54 is less than the width W of the charger 22. The charge port covering assembly 30 could be spring biased toward the covering position. Springs 88 (FIG. 8), for example, can drive the linkage assembly 86 to force the door release assemblies 38 back to a position where the doors 34 are in the covering position. First ends 88*a* of the springs 88 can fit within respective apertures of the linkage assembly 86. Opposite, second ends 88*b* of the springs 88 press against a floor of the outer housing 46.

Positioning the charger 22 between release tabs 54 tilts the release tabs 54 outward away from the charge port 20 and pivots the first pivot members 50 about the first pivots 70. The pivoting movement moves portions of the first pivot members 50 inward toward the charge port 20 and against the second pivot members 58. The movement of the first pivot members 50 against the second pivot members 58 rotates the second pivot members 58 about the second pivots 74 in a direction R.

Figure 8:
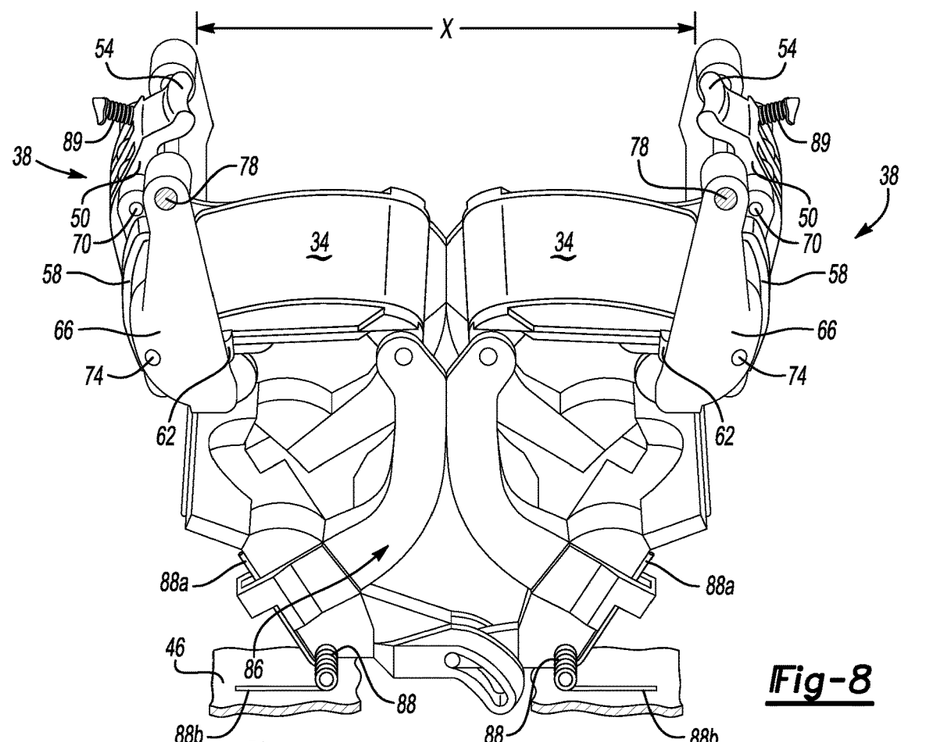
FIG. 8 illustrates the charge port covering assembly having doors in the covering position.
Figure 9:
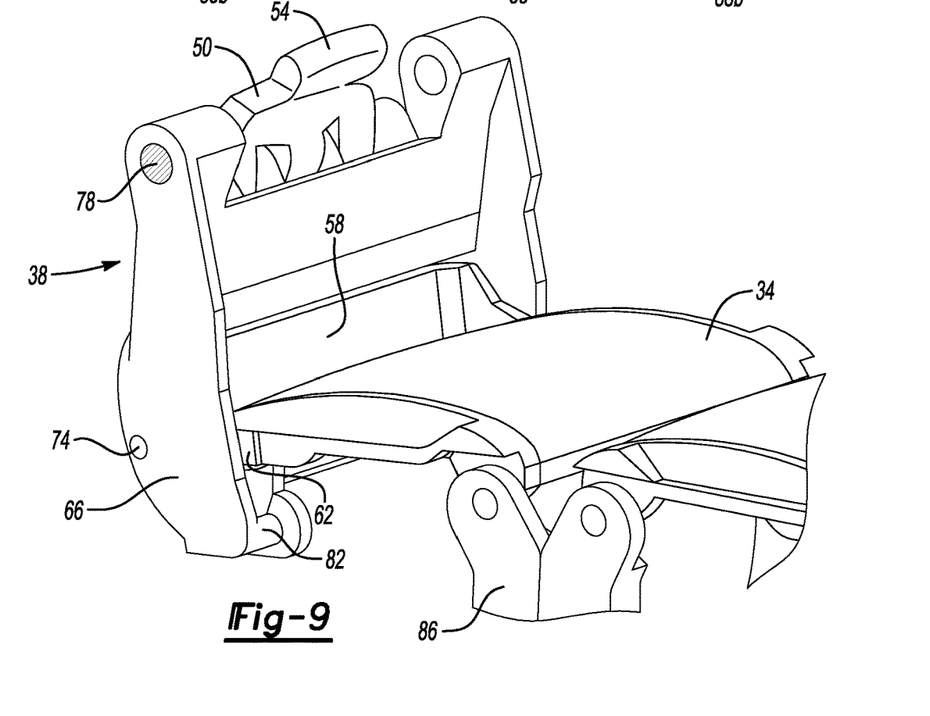
FIG. 9 illustrates a close-up view of a door release assembly of the charge port covering assembly.

The release tabs 54 can be biased inward to the position of FIGS. 5 and 8 by springs 89 (FIG. 8). The springs 89 could be coils springs that are fit between the release tabs 54 and the door release covers 42 to press the release tabs 54 inward.

Figure 10:
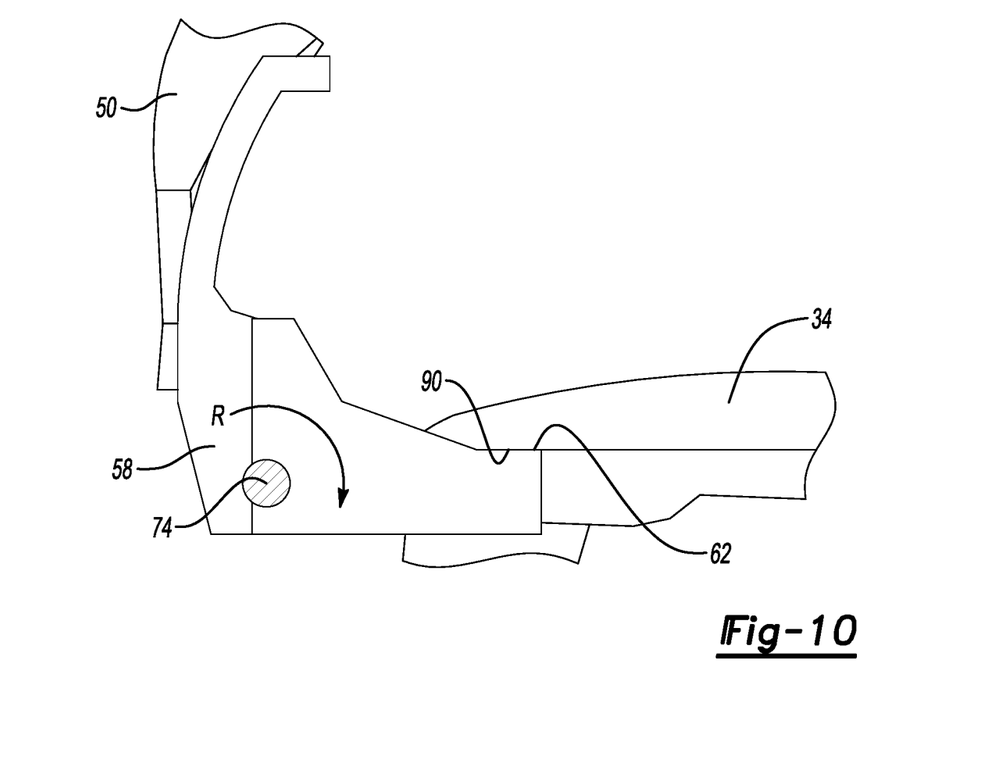
FIG. 10 illustrates selected portions of the door release assembly of FIG. 8 when the doors are in the covering position.
Figure 11:
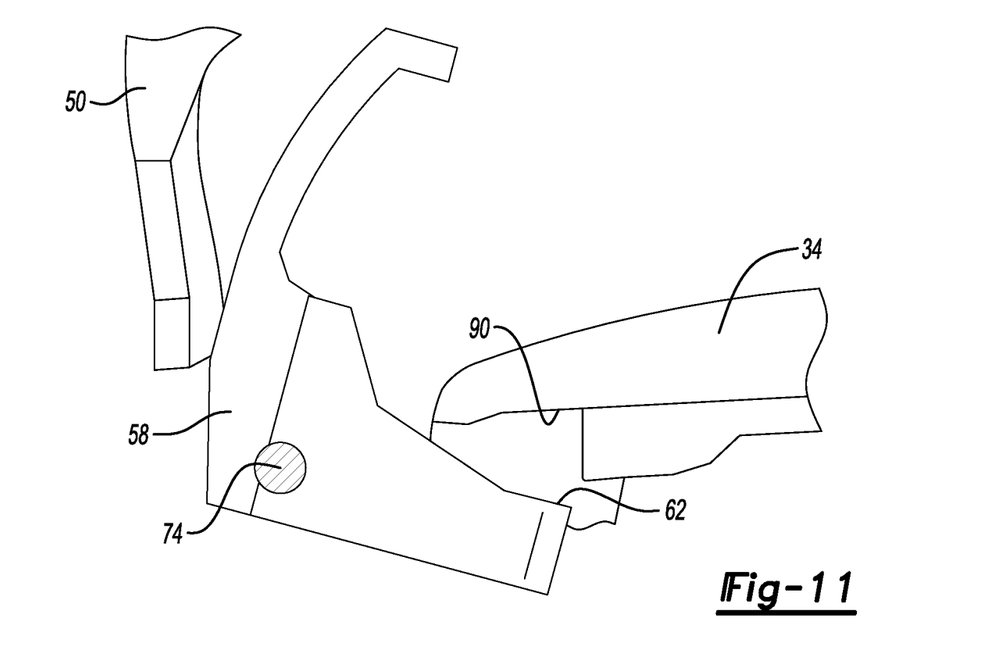
FIG. 11 illustrates selected portions of the door release assembly of FIG. 8 when the doors are in the accessing position.

The rotation in the direction R moves the second pivot members 58 from the position of FIG. 10 to the position of FIG. 11. In the position of FIG. 10, the lock tangs 62 are in a blocking position where the lock tangs 62 contact a ledge 90 of the doors 34 to block retraction of the doors 34. In the position of FIG. 11, the lock tangs 62 have rotated away from the blocking position to a releasing position. In the releasing position, the lock tangs 62 are moved away from the ledges 90 to permit retraction of the doors 34.

Generally, the doors 34 each include an outwardly facing side that faces away from the charge port 20 when the doors 34 are in the engaged position, and an inwardly facing side that faces the charge port 20 when the doors 34 are in the engaged position. The lock tangs 62 are situated such that the lock tangs 62 engaging an inwardly facing surface of the ledge 90.

As the charger 22 continues to move toward the charge port 20, the first pivot members 50, the second pivot members 58, the inner housing 66, and the door release covers 42 are pressed by the charger 22 into a recessed position along the lateral sides of the charge port 20.

After sufficient movement, the charger 22 engages the charge port. Electrical power can then communicate between the grid source 14 and the traction battery of the vehicle 10. After charging the traction battery to a desired level, an operator can decouple the charger from the charge port by moving the charger 22 axially away from the charge port 20. As the charger 22 is withdrawn, the linkage assembly 86 forces the door release assemblies 38 to move the doors 34 back to the covering position due to the biasing force applied by the springs 88.

Figure 12:
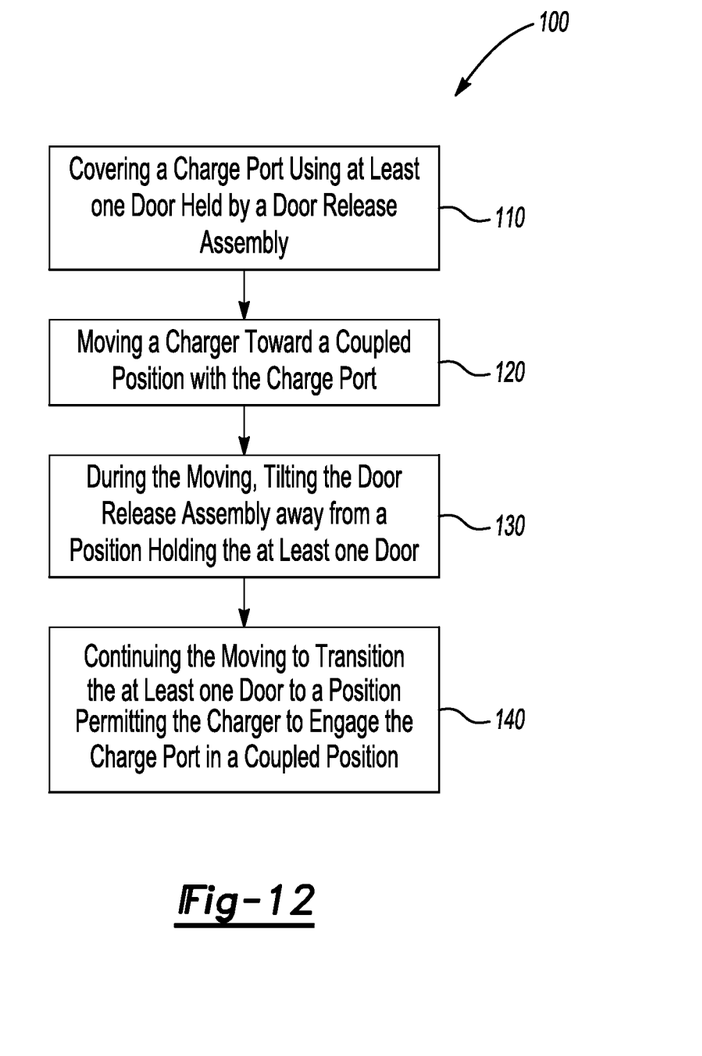
FIG. 12 illustrates flow of an exemplary charge port covering method using the charge port covering assembly.
Figure 13:
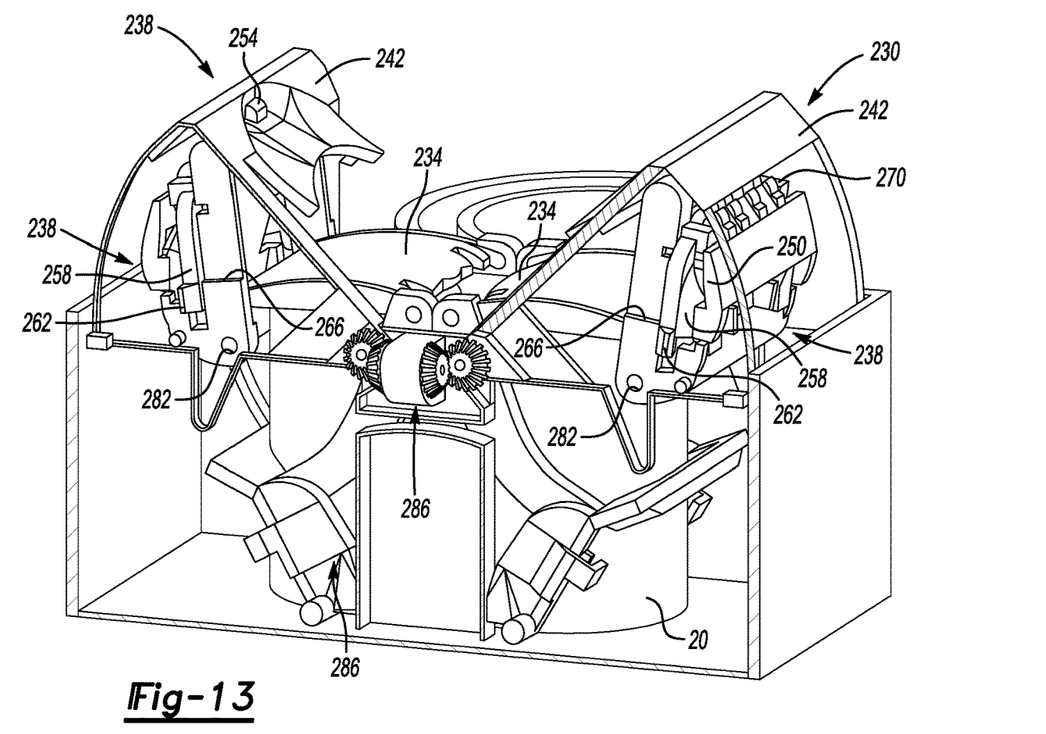
FIGS. 13-16 illustrate selected views of a charge port covering assembly according to another exemplary embodiment of the present disclosure.
Figure 14:
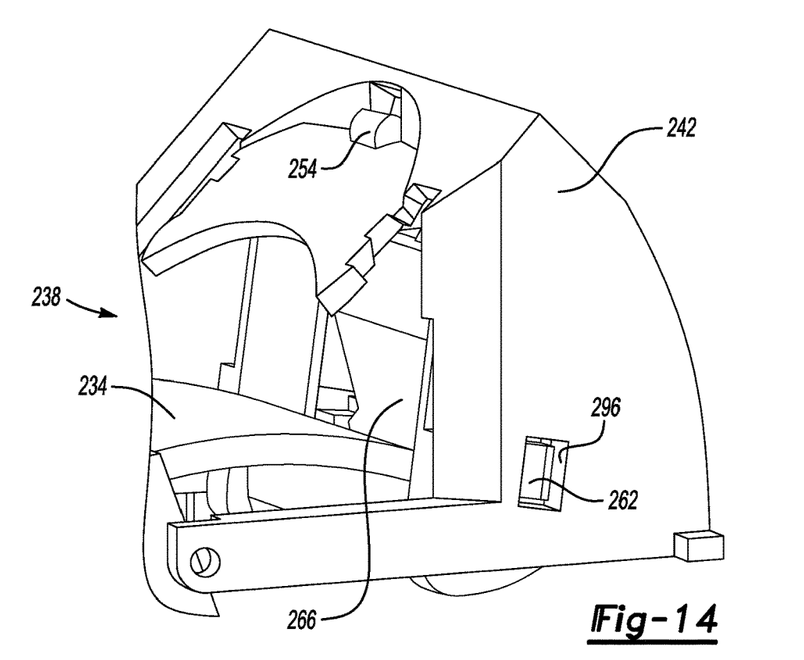
Figure 15:
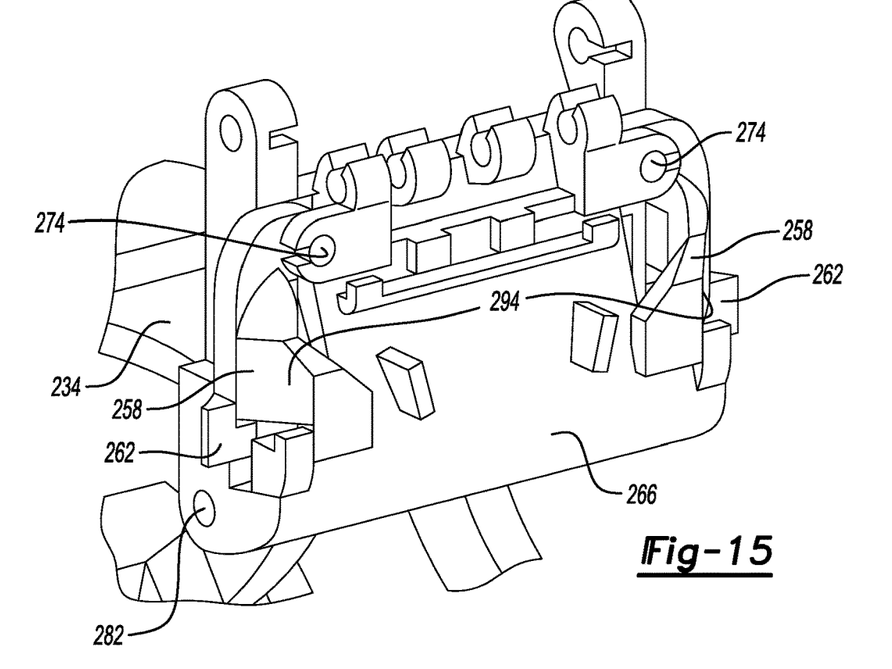
Figure 16:
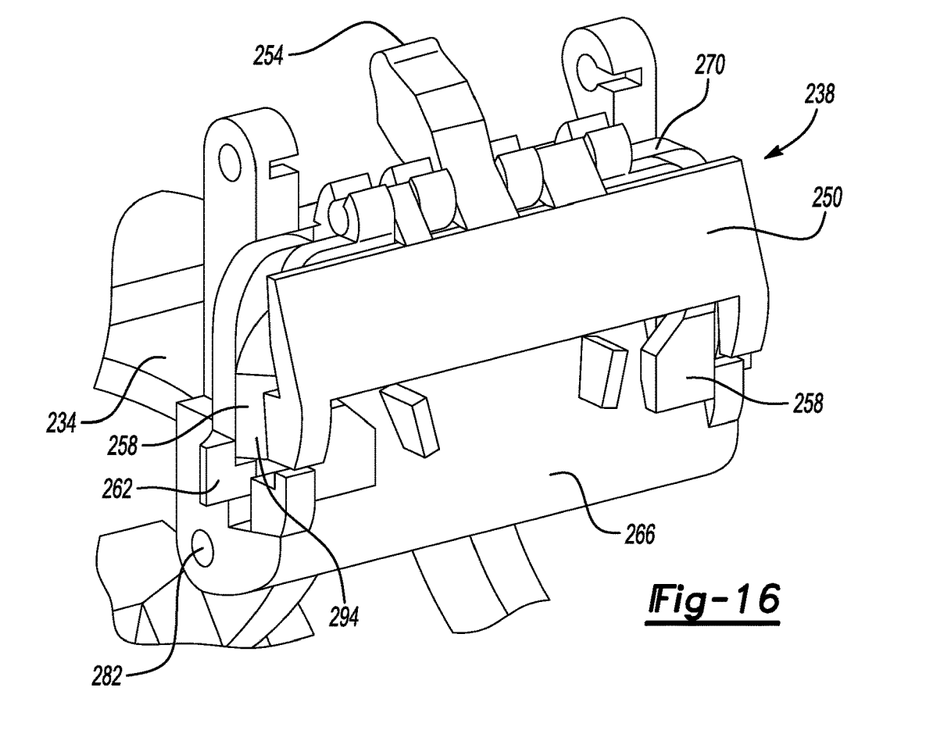

Referring now to FIG. 12, a charge port covering method 100 includes a step 110 of covering a charge port using at least one door held by a door release assembly. Next, a step 120 includes moving the charger toward a coupled position with the charge port. During the moving, as represented by step 130, the door release assembly is tilted away from a position holding the at least one door. Next, a step 140 includes continuing the moving to transition the at least one door to a position that permits the charger to engage the charge port in a coupled position.

With reference to FIGS. 13-16, another exemplary non-limiting embodiment of a charge port covering assembly 230 can transition a plurality of doors 234 back and forth between a covering position and an accessing position relative to the charge port 20. The charge port covering assembly includes the doors 234, door release assemblies 238, door release covers 242, and an outer housing 246.

The door release assemblies 238 each include a first pivot member 250 with a release tab 254, second pivot members 258 with lock tangs 262, and an inner housing 266. The first pivot member 250 is pivotably coupled to the inner housing 266 at a first pivot 270. The second pivot members 258 are pivotably coupled to the inner housing 266 at respective second pivots 274. The inner housings 266 are each pivotably coupled to one of the doors 34 at another pivot 282.

A linkage assembly 286 couples together movement of the door release assemblies 238. The linkage assembly 286, in this example, includes gearing 290 to couple together movement of the door release assemblies 238.

Positioning a charger between the release tabs 254 tilts the first pivot members 250 about the first pivots 270. The tilting of the first pivot members 250 forces a portion of the first pivot members 250 to move against ramped surfaces 294 of the second pivot members 258. This forces the second pivot members 258 to pivot inwardly about the second pivots 274, which withdraws the lock tangs 262 from being received within apertures 296 of the door release covers 242. When the lock tangs 262 are received within the apertures 296, the charge port covering assembly 230 is blocked from transitioning to the accessing position. When the lock tangs 262 are withdrawn from the apertures 296, the charge port covering assembly 230 can transition the doors 34 back to the accessing position.

Figure 17:
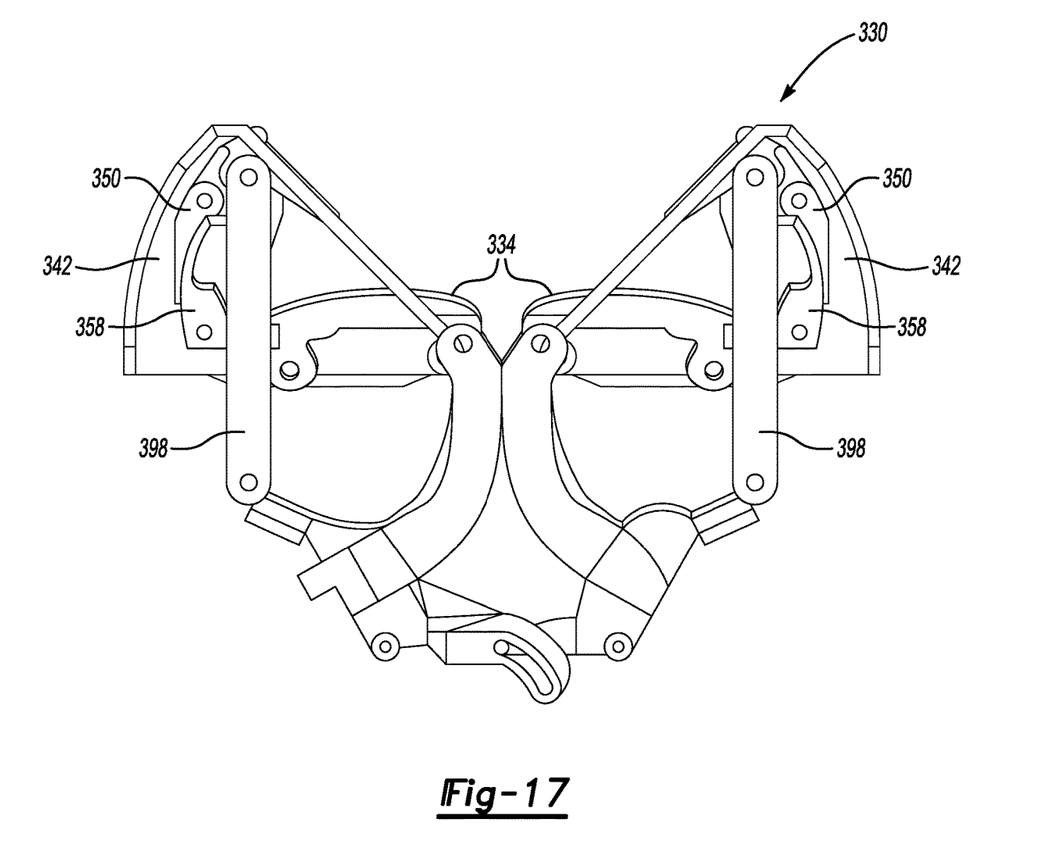
FIG. 17 illustrates a side view of a charge port covering assembly according to yet another exemplary embodiment of the present disclosure.

With reference to FIG. 17, another exemplary non-limiting embodiment of a charge port covering assembly 330 can transition a plurality of doors 334 back and forth between a covering position and an accessing position relative to the charge port 20. The charge port covering assembly 330 substantially includes the features of the charge port covering assembly 30 shown in connection with FIGS. 3-11. However, the charge port covering assembly 330 includes link bars 398 in place of the inner housing 66. Also, the first pivot members 350 and second pivot members 358 are pivotably coupled to the door release covers 342, and the linkage assembly 386 is configured to pivotably coupled to the link bars 398.

Moving the charger 22 toward the charge port 20 covered by the doors 334 of the charge port covering assembly 330 tilts the first pivot members 350 to release the doors 334. Continued movement applies a force to the move the doors 334 to the recessed position. Some of the force is transferred to the linkage assembly 386 through the link bars 398.

Features of the examples of this disclosure include a charge port covering assembly that can mechanically discriminate a charger from devices that are sized differently than the charger. The user is not required to remove a flap or cover from the charge port prior to inserting the charger.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A charge port covering assembly, comprising:
 a plurality of doors moveable between a covering position where the doors block access to a charge port, and an accessing position where the doors permit access to the charge port;
 a door release assembly having a portion that tilts in response to movement of a charger toward an engaged position with the charge port to permit movement of the doors to the accessing position,
 wherein the door release assembly includes a first door release associated with a first door of the plurality of doors, and a second door release associated with a second door of the plurality of doors, the first and second door releases on opposing lateral sides of the charge port; and
 further comprising a first door release cover about the first door release, and a second door release cover about the second door release, the first and second door release covers pivotably coupled to the charge port and configured to pivot in response to movement of the charger toward the engaged position.

2. The charge port covering assembly of claim 1, wherein the plurality of doors includes no more than two doors.

3. The charge port covering assembly of claim 2, wherein the plurality of doors move laterally away from one another when moving from the covering position to the accessing position.

4. The charge port covering assembly of claim 1, further comprising a linkage assembly that operably connects together movement of the first door and movement of the second door.

5. The charge port covering assembly of claim 4, further comprising a first link bar pivotably coupled to the linkage assembly and the first door release, and a second link bar pivotably coupled to the linkage assembly and the second door release.

6. The charge port covering assembly of claim 1, wherein the first door release cover and the first door are configured to retract around a first lateral side of the charge port in response to movement of the charge toward the charge port, and the second door release cover and the second door are configured to retract around an opposite, second lateral side of the charge port in response to movement of the charger toward the charge port.

7. The charge port covering assembly of claim 1, wherein the first door release includes a first lock tang and the second door release includes a second lock tang, wherein tilting the portion of the door release assembly moves the first and second lock tangs from a blocking position to a releasing position, the first and second lock tangs in the blocking position blocking movement of the first and second doors to the accessing position, the first and second lock tangs in the releasing position permitting movement of the first and second doors to the accessing position.

8. The charge port covering assembly of claim 7, wherein the first door includes an outwardly facing side that faces away from the charge port when in the engaged position, and an inwardly facing side that faces the charge port when in the engaged position, the first lock tang engaging an inwardly facing surface of a ledge provided in the first door when the first door is in the engaged position.

9. The charge port covering assembly of claim 7, wherein the first and second lock tangs are closer to each other when in the blocking position than when in the releasing position.

10. The charge port covering assembly of claim 1, wherein the charge port is a noncircular charge port.

11. The charge port covering assembly of claim 10, wherein the charge port is a Direct Current charge port.

12. A charge port covering method, comprising:
 blocking access to a charge port using a plurality of doors in a covering position; and
 tilting a portion of a door release assembly with a charger to permit a transitioning of the plurality of doors from the covering position to an accessing position where the charger can couple with the charge port,
 wherein the tilting includes rotating a first pivot member of the door release assembly against a second pivot member to move a lock tang of the second pivot member from a blocking position that blocks movement of one of the plurality of doors to the accessing position to a releasing position that permits movement of the one of the plurality of doors to the accessing position.

13. The charge port covering method of claim 12, wherein the first pivot member and the second pivot member are pivotably coupled to an inner housing and held within a door release housing.

* * * * *